US012610439B2

(12) United States Patent
Medrano et al.

(10) Patent No.: US 12,610,439 B2
(45) Date of Patent: Apr. 21, 2026

(54) LED SWITCHING POWER SUPPLY

(71) Applicant: Resideo LLC, Golden Valley, MN (US)

(72) Inventors: Jesus Medrano, Chihuahua (MX); Adrian Lopez, Chihuahua (MX); Arturo Romero, Chihuahua (MX); Georgina Garcia, Chihuahua (MX)

(73) Assignee: RESIDEO LLC, Golden Valley, MN (US)

( * ) Notice: Subject to any disclaimer, the term of this patent is extended or adjusted under 35 U.S.C. 154(b) by 0 days.

(21) Appl. No.: 18/693,669

(22) PCT Filed: Sep. 20, 2022

(86) PCT No.: PCT/US2022/044124
§ 371 (c)(1),
(2) Date: Mar. 20, 2024

(87) PCT Pub. No.: WO2023/049115
PCT Pub. Date: Mar. 30, 2023

(65) Prior Publication Data
US 2025/0142700 A1 May 1, 2025

Related U.S. Application Data

(60) Provisional application No. 63/246,553, filed on Sep. 21, 2021.

(51) Int. Cl.
*H05B 45/30* (2020.01)
*H05B 45/325* (2020.01)
(Continued)

(52) U.S. Cl.
CPC .......... *H05B 45/325* (2020.01); *H05B 45/44* (2020.01)

(58) Field of Classification Search
CPC ...... H05B 45/30; H05B 45/325; H05B 45/37; H05B 45/3725; H05B 45/38; H05B 45/44; H05B 45/54
See application file for complete search history.

(56) References Cited

U.S. PATENT DOCUMENTS 9,095,024 B1 * 7/2015 Zhang .................. G09G 3/3406
9,692,316 B1 * 6/2017 Ryu .................... H02M 5/2573
(Continued)

FOREIGN PATENT DOCUMENTS

EP 2648483 A1 10/2013
JP 2009-130653 A 6/2009
(Continued)

OTHER PUBLICATIONS

International Search Report and Written Opinion in PCT International Application No. PCT/US2022/044124 mailed Jan. 5, 2023.

*Primary Examiner* — Thai Pham
(74) *Attorney, Agent, or Firm* — Greenberg Traurig LLP; Ryan D. Sharp; David J. Dykeman

(57) ABSTRACT

An LED driver includes a main power source, a transistor connected to a controller, an inductor, a diode, and a capacitor. The inductor is connected to a diode at a first end and connected to a main power source and the capacitor at a second end. The diode is also connected to the capacitor. The controller is configured to switch the transistor between an active state and an inactive state. When the transistor is in the active state, the inductor is charged by the main power source. When the transistor is in the inactive state, the inductor charges the capacitor through the diode until a capacitor current is greater than a diode current. At which point, the capacitor's voltage is in series with the main power source's voltage, and the sum of their voltages supply power to LED(s) connected to the capacitor.

20 Claims, 4 Drawing Sheets

(51) Int. Cl.
*H05B 45/37* (2020.01)
*H05B 45/44* (2020.01)

(56) References Cited

U.S. PATENT DOCUMENTS

| | | | | |
|---|---|---|---|---|
| 10,743,380 | B2 * | 8/2020 | Tseng | H05B 45/10 |
| 10,999,905 | B2 * | 5/2021 | Eum | H05B 45/375 |
| 2008/0116818 | A1 * | 5/2008 | Shteynberg | H05B 45/46 315/192 |
| 2014/0145640 | A1 * | 5/2014 | Park | H05B 45/44 315/287 |
| 2015/0257230 | A1 * | 9/2015 | Lee | H05B 45/10 315/186 |
| 2017/0188422 | A1 * | 6/2017 | Han | H02M 1/4225 |
| 2018/0114133 | A1 | 4/2018 | Chowdhary et al. | |

FOREIGN PATENT DOCUMENTS

| | | | |
|---|---|---|---|
| JP | 2014-013493 | A | 1/2014 |
| JP | 2014-520366 | A | 8/2014 |
| KR | 2008-0009110 | A | 1/2008 |
| KR | 2014-0069475 | A | 6/2014 |
| WO | 2013022883 | A1 | 2/2013 |
| WO | 2015027533 | A1 | 3/2015 |

* cited by examiner

LED SWITCHING POWER SUPPLY

CROSS-REFERENCE TO RELATED APPLICATIONS

This application is a U.S. National Phase patent application under 35 U.S.C. § 371 of International Application No. PCT/US2022/044124, filed Sep. 20, 2022, which claims priority to and the benefit of U.S. Provisional Patent Application No. 63/246,553, filed Sep. 21, 2021, the entire contents of each of which are incorporated herein by reference.

BACKGROUND

Light emitting diodes (LEDs) are employed in various applications involving illumination including backlighting, lamps, and other lighting applications. To power an LED, an LED circuit/LED driver is used, which provides sufficient current to light the LED at a desired brightness, but which also limits the current to prevent damaging the LED. Simple circuits, such as a single series resistor, may be used to power an LED in some basic applications. However, simple LED drivers often have decreased efficiency, whereby more energy is wasted in the form of heat instead of being used by the LED for illumination. In more complex applications, such as high-power LEDs and dimmable LEDs, more complex circuitry is necessary. Complex LED drivers, though, may involve using integrated circuits (ICs) and have increased cost compared to less complex LED drivers. Further, more complex LED drivers may be limited in their ability to be adapted to different applications.

SUMMARY

This disclosure in general describes LED switching power supply embodiments as well as related methods. In particular, embodiments disclosed herein can, for instance, drive one or more LEDs using circuitry which is low cost and power efficient.

In one aspect of the present disclosure, an LED driver for driving one or more LEDs is disclosed. The LED driver comprises a main power source and a transistor electrically connected to a controller. The controller is configured to switch the transistor between an active state and an inactive state. The LED driver further comprises an inductor electrically connected to the transistor and a diode at a first end and further electrically connected to the main power source and a capacitor at a second end. The diode is also electrically connected to the capacitor. In the embodiment, when the transistor of the LED driver is in the active state, the inductor is charged by the main power source. Further, in the embodiment, when the transistor of the LED driver is in the inactive state, the inductor charges the capacitor through the diode until a capacitor current is greater than a diode current. At such a point, the capacitor's voltage is in series with the main power source's voltage, and the sum of their voltages supplies power to an LED electrically connected to the capacitor.

In a further embodiment of the LED driver, the transistor, the inductor, and the capacitor are discrete components.

In a further embodiment of the LED driver, the LED driver comprises a resistor electrically connected to the transistor in series with the resistor configured to limit current drawn from the main power source when the transistor is in the active state.

In a further embodiment of the LED driver, the LED driver comprises a second resistor electrically connected to the capacitor in series through the LED and which is configured to limit current flowing through the LED when the transistor is in the inactive state and the capacitor and the main power source supply power to the LED.

In a further embodiment of the LED driver, the controller is configured to send a pulse width modulation signal to the transistor to switch the transistor between the active state and the inactive state.

In a further embodiment of the LED driver, the transistor is a bipolar junction transistor comprising a base, a collector, and an emitter, the inductor and the diode electrically connected to the collector with the controller electrically connected to the base.

In a further embodiment of the LED driver, the inductor is a high frequency inductor.

In a further embodiment of the LED driver, the capacitor and the main power source supply power to multiple LEDs.

In another aspect of the present disclosure, a discrete LED driver is disclosed. The discrete LED driver comprises a power source and a controller electrically connected to a transistor a first node. In the embodiment, the controller is configured to switch the transistor between a first state and a second state. The discrete LED driver further comprises one or more inductors electrically connected to the transistor at a second node and a diode electrically connected to the transistor at the second node. The discrete LED driver also comprises one or more capacitors electrically in parallel to the one or more inductors with the one or more capacitors electrically connected to the transistor at the second node via the diode. In the embodiment, when the transistor is in the first state, the power source charges the one or more inductors. Further, in the embodiment, when the transistor is in the second state, the one or more inductors charge the one or more capacitors through the diode until a current of the one or more capacitors is greater than a diode current. As such a point, the voltage of the one or more capacitors is in series with the power source's voltage, and the sum of their voltages supply power to an LED.

In a further embodiment of the discrete LED driver, the first state is an active state and the second state is an inactive state. In the embodiment, the active state completes a circuit between the power source and a ground through the one or more inductors. Further, in the embodiment, the inactive state disconnects the circuit between the power source and the ground.

In a further embodiment of the discrete LED driver, the discrete LED driver comprises one or more resistors electrically connected to the transistor at a third node with the one or more resistors configured to limit the current from the power source when the transistor is in the active state.

In a further embodiment of the discrete LED driver, the transistor is a bipolar junction transistor comprising a base, a collector, and an emitter with the first node being the base, the second node being the collector, and the third node being the emitter.

In a further embodiment of the discrete LED driver, the controller uses a pulse width modulation signal to switch the transistor between the first state and the second state.

In a further embodiment of the discrete LED driver, the diode is a Schottky diode.

In another aspect of the present disclosure, a method of providing power to one or more LEDs is disclosed. The method comprises providing a transistor with a PWM signal to activate the transistor. In the embodiment, when the transistor is activated, an inductor, connected in series with the transistor and a power source, is charged by the power source. The method further comprises providing a transistor with a PWM signal to deactivate the transistor. In the embodiment, when the transistor is deactivated, the inductor becomes connected in series with a capacitor and charges the capacitor through a diode. Further in the embodiment, when the transistor is deactivated, a voltage across the capacitor becomes connected in series with the power source and discharges to one or more LEDs, with the voltage across the capacitor being added to the voltage provided by the power source.

In a further embodiment, the method also includes limiting current provided to the inductor from the power source using a first limiting resistor when the transistor is activated.

In a further embodiment, the method also includes limiting current provided to the one or more LEDs from the capacitor and the power source using a second limiting resistor when the transistor is deactivated.

In a further embodiment, the method also includes adjusting the duty cycle of the transistor using the PWM signal to adjust an output voltage provided to the one or more LEDs.

BRIEF DESCRIPTION OF DRAWINGS

The following drawings are illustrative of particular embodiments of the invention and therefore do not limit the scope of the invention. The drawings are not necessarily to scale (unless so stated) and are intended for use with the explanations in the following detailed description. Embodiments of the invention will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides some practical illustrations for implementing various embodiments of the present invention. Those skilled in the art will recognize that many of the noted examples have a variety of suitable alternatives.

Figure 1:
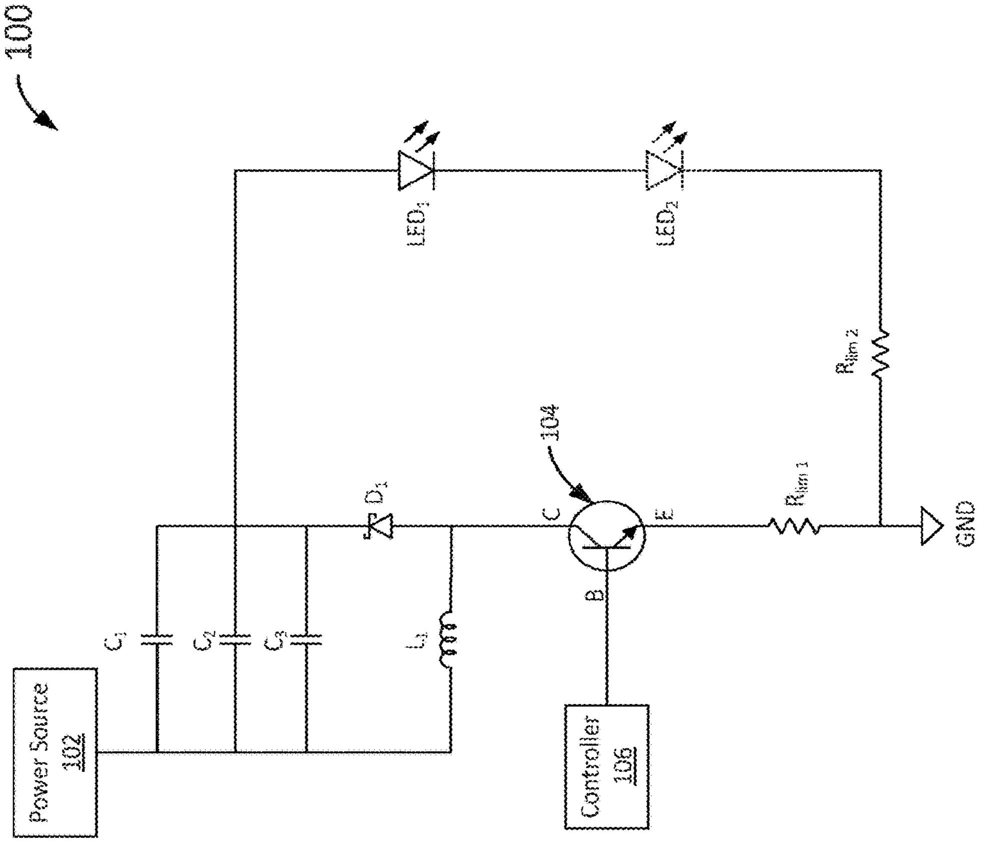
FIG. 1 is a schematic diagram of an example LED switching power supply according to an aspect of the present disclosure.

FIG. 1 is a schematic diagram of an example LED switching power supply 100 according to an aspect of the present disclosure. The LED switching power supply 100, also referred to as switching power supply 100, is a type of LED driver that can manage current to power one or more LEDs. The switching power supply 100 is powered by a power source 102 and includes a variety of components such as capacitors, inductors, resistors, diodes, and transistors (e.g., transistor 104). The switching power supply 100 also includes a controller 106 that can be configured to control the transistor 104 to control the switching aspect of the switching power supply. In operation, the power source 102 and the voltage stored in the capacitor(s) provide power to the LEDs, $LED_1$ and $LED_2$, via the switching power supply 100 with the controller 106 configured to control the switching power supply to adjust aspects of the LEDs (e.g., brightness).

The power source 102 can be any type of power source including wall power provided by an electrical grid and/or batteries. In some examples, the power source 102 is wall power from an electrical grid that has been rectified to a DC voltage with battery power as a backup to the wall power should wall power be unavailable. The power source 102 can provide power in the form of current and voltage. In some examples, the power source 102 provides substantially the same voltage with the current able to vary depending on the load. For example, the power source 102 can be one or more batteries (e.g., AA, AAA) that have a voltage of 1.5V when fully charged that decreases slightly as they are discharged over time. In some examples, the power source provides substantially the same current with the voltage able to vary depending on the load. The power source 102 can, in some examples, include circuitry that can adjust the voltage and/or current to a desired level. A person having ordinary skill in the art will appreciate that other power sources are contemplated, and this disclosure is not limited to the listed examples of power sources.

Continuing with FIG. 1, the switching power supply 100 includes a transistor 104 and a controller 106, electrically connected to the transistor 104 and configured to control the transistor. In the illustrated embodiment, a bipolar junction transistor (BJT) is used, which includes a collector C, a base B, and an emitter E with the controller 106 electrically connected to the base of the BJT. In some examples, the base can be a first node of the transistor 104, the collector can be a second node, and the emitter can be a third node. In some such examples, the controller is connected to the first node of the transistor. However, other transistors, such as field-effect transistors (FETs), can also be used and can include different nodes. In operation, the transistor 104 acts as a switch, having an on/active state, and an off/inactive state. In the on/active state, current can flow through the transistor 104 while in the off/inactive state, current is prevented from flowing through the transistor 104.

The controller 106 controls whether the transistor 104 is in the on/active state or the off/inactive state by providing a signal to the transistor 104. In some examples, the controller provides a digital signal to the transistor to switch the state of the transistor 104. In some such examples, the controller 106 provides a pulse-width modulation (PWM) signal to the transistor 104 to control the duty cycle of the transistor 104. The controller 106 can adjust the PWM signal to have any frequency for switching the transistor, which can adjust operation of the switching power supply as is discussed elsewhere herein. In some examples, the controller can be directly or indirectly controlled by a user to adjust the PWM signal.

Further in FIG. 1, the switching power supply 100 includes electrical components including a diode $D_1$, an inductor $L_1$, capacitors $C_1$, $C_2$, $C_3$ connected in parallel with each other, and resistors $R_{lim1}$, and $R_{lim2}$. The components can be discrete components, whereby they are individual components that are not part of an IC. Starting with the diode $D_1$, the diode $D_1$ can be any type of diode, however, in the illustrated embodiment, the diode $D_1$ is a Schottky diode. Using a Schottky diode can be advantageous as it improves the efficiency of the switching power supply. The diode $D_1$ is electrically connected at one end to the transistor 104 at the collector/second node. The diode $D_1$ is further electrically connected, at its other end, to the capacitors $C_1$, $C_2$, $C_3$. In operation, the diode can allow current to flow through it from the end connected to the transistor 104 and the inductor $L_1$ to the end connected to the capacitors $C_1$, $C_2$, $C_3$. It can also prevent current from flowing in the opposite direction from the capacitors $C_1$, $C_2$, $C_3$ to the inductor $L_1$.

Moving to the inductor, the inductor $L_1$ is electrically connected at a first end to the transistor 104. In the illustrated embodiment, the electrical connection is at the collector/second node of the transistor 104. The inductor $L_1$ is further electrically connected, at a second end, to the capacitors $C_1$, $C_2$, $C_3$ and the power source 102. As illustrated in the embodiment of FIG. 1, the inductor $L_1$ is connected in parallel with the capacitors $C_1$, $C_2$, $C_3$ and is connected in series with the diode $D_1$. In operation, the inductor $L_1$ can receive and store energy in a magnetic field such as, for example, electrical energy provided to it from the power source 102. The inductor can be any type of inductor and can further have any amount of inductance. However, in some embodiments, the inductor $L_1$ is a high frequency inductor.

Moving to the capacitors $C_1$, $C_2$, $C_3$, the capacitors are electrically connected in parallel with each other. The capacitors are further electrically connected to the power source 102, the inductor $L_1$, the diode $D_1$, and the LEDs, $LED_1$ and $LED_2$. In operation, the capacitors $C_1$, $C_2$, $C_3$ can receive and store energy in an electric field, such as, for example, electrical energy provided to them from the inductor $L_1$. The capacitors $C_1$, $C_2$, $C_3$ can be any type of capacitor including ceramic, film, and electrolytic and can have any value of capacitance. Furthermore, the capacitors $C_1$, $C_2$, $C_3$ can be different from each other in both type and value. For example, $C_1$ can be an electrolytic capacitor of 10 μF while $C_2$ can be a ceramic capacitor of 0.1 μF. In some examples, the largest capacitor of the capacitors $C_1$, $C_2$, $C_3$ is the primary store of energy while the smaller capacitors can reduce noise in the voltage signal. In some embodiments, only one capacitor is used instead of multiple capacitors as illustrated in the embodiment of FIG. 1. It will be appreciated that any number of capacitors connected in parallel with each other can be used.

Moving to the resistors $R_{lim1}$ and $R_{lim2}$, $R_{lim1}$ is electrically connected to the transistor 104 at the emitter/third node and is further connected to a ground (GND). $R_{lim2}$, though, is electrically connected to $LED_2$ and to the ground. Regardless of how many LEDs the LED switching power supply 100 is powering, $R_{lim2}$ can be connected to the last LED and the ground. In operation, the resistors $R_{lim1}$ and $R_{lim2}$ can limit an amount of current in their connected circuit. For example, $R_{lim1}$ can limit the amount of current flowing through the inductor $L_1$ from the power source 102 when the transistor 104 is on. In addition, $R_{lim1}$ can limit the current flowing through the transistor, such as between the collector and emitter of a BJT transistor. This can reduce the power draw from the power source 102, which can be beneficial with limited power sources (e.g., batteries). Further, limiting the current through the transistor can enable a lower-cost transistor to be used. In another example, $R_{lim2}$ can limit the amount of current flowing through the LEDs, $LED_1$ and $LED_2$ when the transistor is off. The resistors can be any type of resistor and can further have any value of resistance. In some examples, the resistors can have a variable amount of resistance. In some examples, the resistance of the resistors can be chosen based on the other components. For example, the resistance of $R_{lim2}$ can be chosen based on the desired brightness of any connected LEDs (e.g., $LED_1$ and $LED_2$).

The electrical connections described above between various components of the switching power supply 100 are described to provide a clearer understanding of the connections. It will be appreciated that the components, such as the diode $D_1$, the inductor $L_1$, the capacitors $C_1$, $C_2$, $C_3$, the transistor 104, the LEDs, $LED_1$ and $LED_2$, and the resistors $R_{lim1}$, and $R_{lim2}$ are electrically connected to each other directly or indirectly. For example, the inductor $L_1$ is electrically connected to the resistor $R_{lim2}$ indirectly through the capacitors $C_1$, $C_2$, $C_3$, the diode $D_1$, and the LEDs $LED_1$ and $LED_2$.

Moving to FIG. 2A-FIG. 2D, FIG. 2A-FIG. 2D are schematic diagrams illustrating an example operation of an LED switching power supply 200 according to an aspect of the present disclosure. Starting at FIG. 2A, the controller 206, can send a PWM signal to the transistor 204 to be in an on/active state. With the transistor 204 in an on/active state, a circuit between the power source 202 (VCC) and the ground (GND) is completed through the transistor 204. As illustrated by the dashed arrows, current from the power source 202 flows through the inductor $L_1$, through the transistor 204, through the resistor $R_{lim1}$, and finally to the ground (GND). During the time when the transistor is in an on/active state, the power source 202 provides energy in the form of current at a voltage to the inductor $L_1$. The inductor $L_1$ receives the energy from the power source 202 and stores some amount of the received energy in a magnetic field. In some examples, the current provided to the inductor is limited by the resistor $R_{lim1}$. Limiting the current can reduce the load on the power source 202 and, in examples in which the power source 202 is one or more batteries, can increase the lifespan of the power source 202.

Figure 2B:
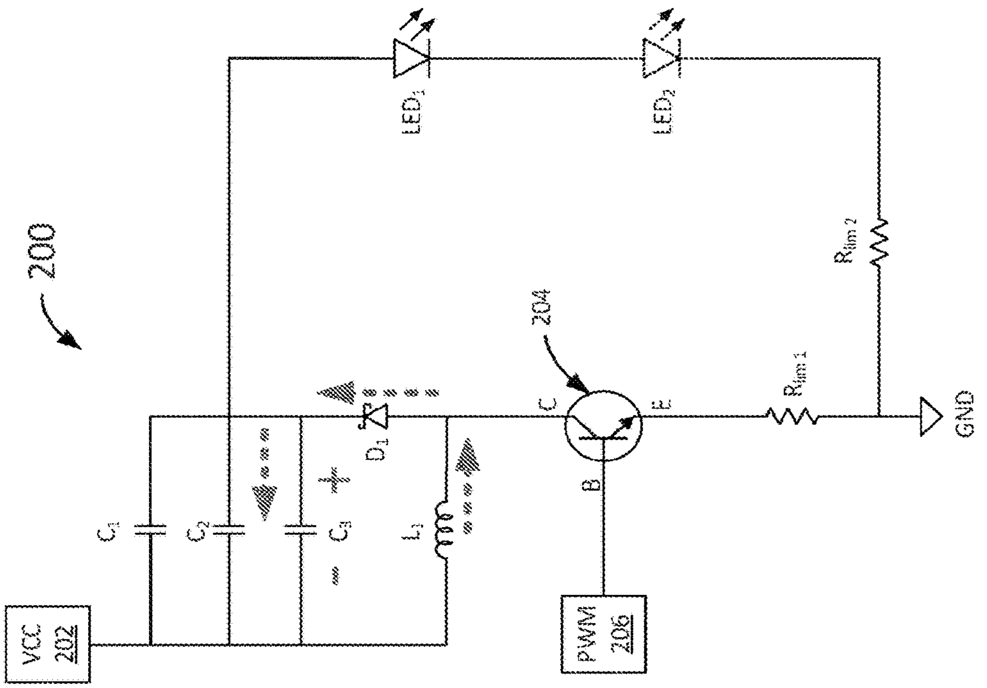
FIG. 2A-FIG. 2D are schematic diagrams illustrating an example operation of an LED switching power supply according to an aspect of the present disclosure.
Figure 2A:
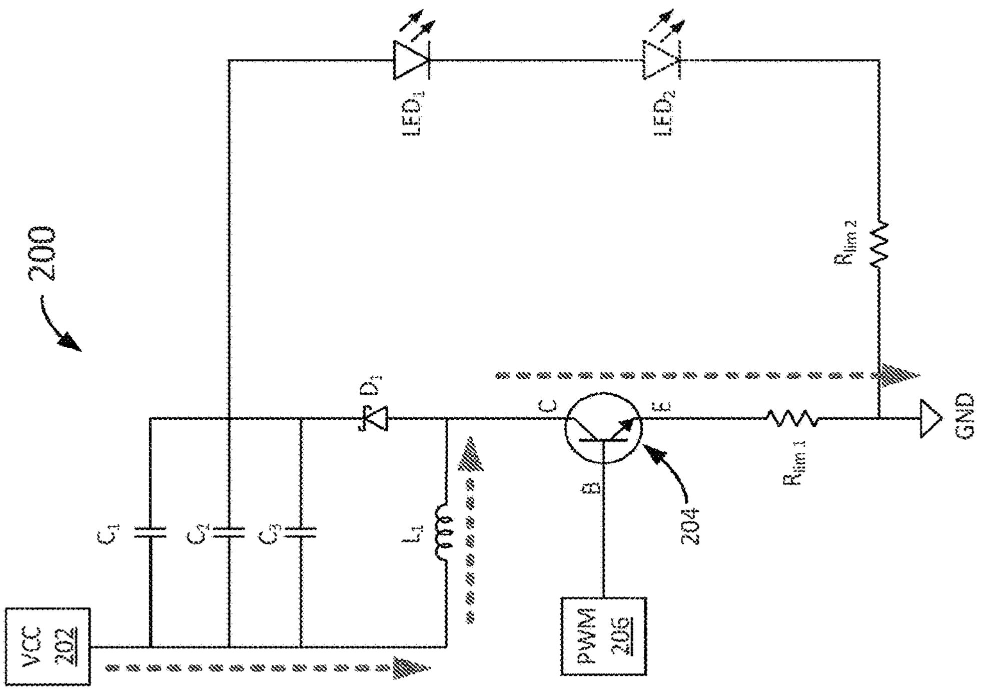

Moving to FIG. 2B, after a period determined by the PWM signal sent from the controller 206 to the transistor 204, the transistor 204 can switch off and be in an off/inactive state. In the off/inactive state, no current can flow from the power source 202 to the ground through the transistor and the circuit from the power source 202 through the transistor is broken. However, a circuit is formed between the power source 202 and the ground through the capacitors $C_1$, $C_2$, $C_3$, the LEDs $LED_1$, $LED_2$, and the resistor $R_{lim2}$. Additionally, during this time, energy stored in the inductor $L_1$ can be released. As illustrated by the dashed arrows in FIG. 2B, the energy stored in the inductor $L_1$ is released in the form of current flowing from the inductor $L_1$, through the diode $D_1$, and into the capacitor $C_3$. As $C_3$ is connected to $C_2$ and $C_1$ in parallel, current also flows into the capacitors $C_1$ and $C_2$. The current flow from the inductor $L_1$, and thus the stored energy of the inductor $L_1$, charges the capacitors $C_1$, $C_2$, $C_3$. Because of the diode $D_1$, current is prevented from flowing back into the inductor $L_1$ and the energy released by the inductor $L_1$ does not recharge the inductor $L_1$. Further, as current takes the path of least resistance and capacitors ideally have no resistance, current does not flow into the LEDs $LED_1$ and $LED_2$ from the inductor $L_1$. In the embodiment of FIG. 2B, and as shown by the +/− signs, the capacitors $C_1$, $C_2$, $C_3$ are charged such that they have a positive voltage across them in the direction of the current charging them.

Figure 2C:
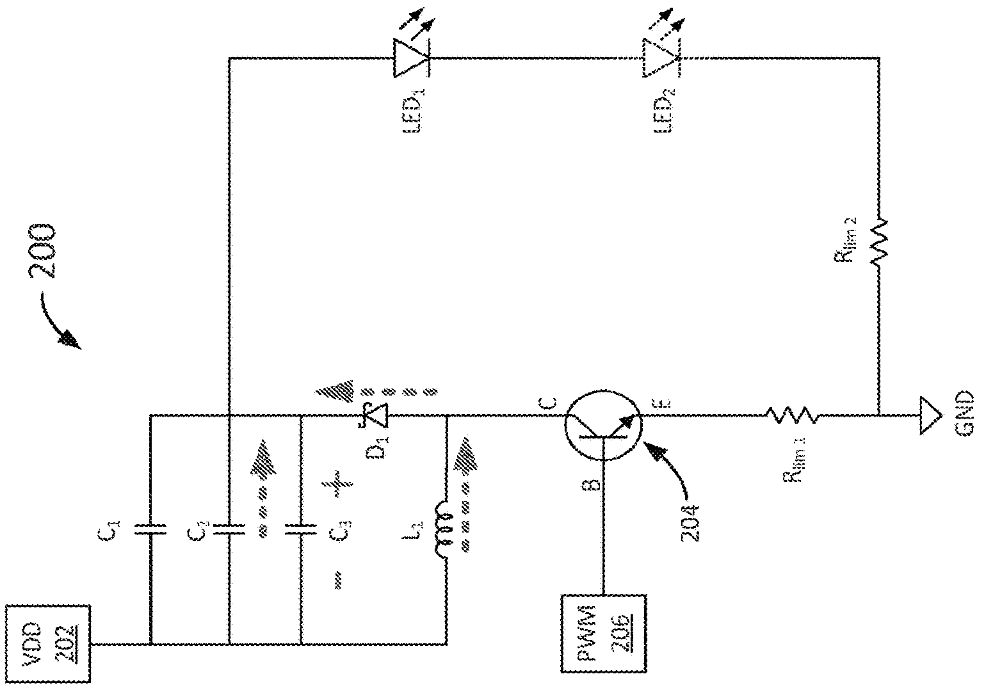

Moving to FIG. 2C, after the capacitors $C_1$, $C_2$, $C_3$ are charged sufficiently, the stored energy of the capacitors $C_1$, $C_2$, $C_3$, and the current associated with the stored energy, becomes larger than the current flowing through the diode $D_1$. At such a point, the diode $D_1$ will appear as an open circuit to the current coming from the capacitors $C_1$, $C_2$, $C_3$ due to the diode preventing backward current flow: As illustrated by the dashed arrows in FIG. 2C, current flows outward from the capacitors $C_1$, $C_2$, $C_3$, opposite the current flow of FIG. 2B when the capacitors were charging. Additionally, whatever energy is remaining in the inductor is discharged through the diode and added to the energy discharged by the capacitor. As indicated by the arrows, current continues to flow from the inductor and through the diode, but instead of charging the capacitor, the current is added to the current flowing outward from the capacitors $C_1$, $C_2$, $C_3$.

Figure 2D:
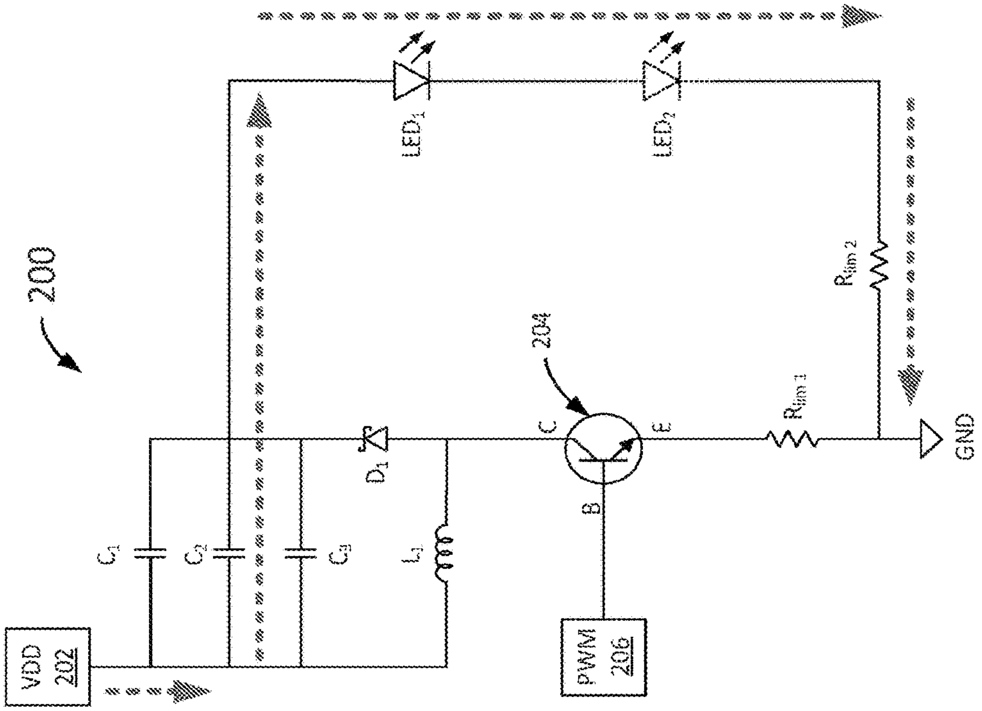

Moving to FIG. 2D, the dashed arrows show the current flow of the completed circuit between the power source 202 and the ground through the LEDs $LED_1$ and $LED_2$ as the capacitors $C_1$, $C_2$, $C_3$ discharge. The current flow can be limited by the limiting resistor $R_{lim2}$, which can, in some examples, decrease the brightness of the LEDs $LED_1$ and $LED_2$. As the capacitors $C_1$, $C_2$, $C_3$ discharge, they become connected in series with the power source 202 and the LEDs $LED_1$ and $LED_2$. When in series, the voltage across the capacitors $C_1$, $C_2$, $C_3$ is added to the voltage of the power source 202. The resulting sum of their voltages is the voltage that drives the LEDs $LED_1$ and $LED_2$ at the desired current (e.g., operating current) and supplies power to the LEDs. The resulting sum of voltages is larger than the voltage the power source 202 can supply on its own as the LED switching power supply 200 boosts the voltage from the power source 202 via storing and discharging energy in the inductor and capacitors.

Once the capacitors $C_1$, $C_2$, $C_3$ have discharged some amount, the controller 206 can switch the transistor 204 back to the on/active state and the process described in FIG. 2A-FIG. 2D can be repeated. In some examples, the capacitors $C_1$, $C_2$, $C_3$ are discharged fully before the transistor 204 is switched.

The controller 206 controls the process described in FIG. 2A-FIG. 2D and specifically controls the duty cycle of the transistor. For example, the controller 206 controls when, and for how long, the transistor 204 is in its on/active or its off/inactive state. The controller 206 can control the duty cycle of the transistor using a PWM signal that can go from a "high" state, which switches the transistor 204 to an on/active state, to a "low" state, which switches the transistor 204 to an off/inactive state. The controller 206 can control the frequency and period at which the PWM signal goes from a "high" state to a "low" state and the frequency and period at which the PWM signal goes from a "low" state to a "high" state. For example, the controller can generate a PWM signal having a "high" state that lasts longer than a "low" state. This would give the inductor $L_1$ a longer time to charge than the time it would take for the inductor to discharge to the capacitors and for the capacitors to discharge to the LEDs. In another example, the controller can generate a PWM signal having a "high" state that does not last as long as a "low" state. This would give the inductor $L_1$ a shorter time to charge than the time it would take for the inductor to discharge to the capacitors and for the capacitors to discharge to the LEDs. By adjusting the frequency and period of the PWM signal, and thereby adjusting the duty cycle of the transistor, the controller 206 can adjust the overall voltage applied to the LEDs $LED_1$ and $LED_2$. For example, in some embodiments, the controller 206 can adjust the PWM signal to compensate for a power source 202 that has a decreased voltage relative to its fully charged voltage. This adjustment can ensure proper operation of the connected LEDs (e.g., $LED_1$ and $LED_2$) even though the power source 202 has lost some charge.

The design of the LED switching power supply described above in relation to FIG. 2A-FIG. 2D can have certain advantages over existing LED power supplies/drivers. For instance, compared to other switching power supplies, the LED switching power supply of the present disclosure can have a higher efficiency with lower heat generation due to, for example, the chosen discrete components. Additionally, because the LED switching power supply uses discrete components compared to ICs, the cost of the circuitry to drive an LED is lower. Furthermore, using discrete components can allow for more versatile circuits. For example, by simply swapping out one component such as the inductor $L_1$ or the current limiting resistor $R_{lim2}$, the operation of the LED switching power supply can be adjusted, such as to dim the LED or power multiple LEDs instead of a single LED. In comparison, an IC driver circuit cannot be easily modified for different conditions. While dimming can be done via other means, hardware dimming can be more reliable.

Figure 3:
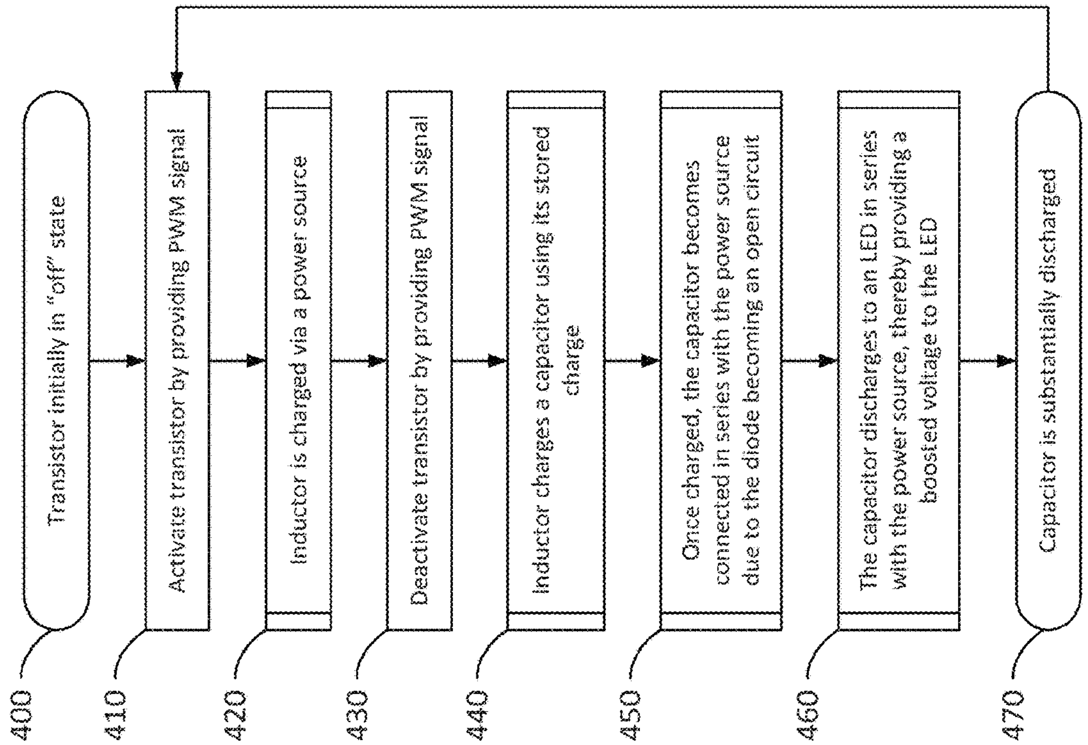
FIG. 3 is a flow diagram of an example operation of an LED switching power supply according to an aspect of the present disclosure.

Moving to FIG. 3, FIG. 3 is a flow diagram of an example operation of an LED switching power supply according to an aspect of the present disclosure. Starting at 400, a transistor can be initially in an "off" or inactive state whereby no current flows through it. Then, at step 410, a controller can activate the transistor by providing a PWM signal to the transistor. When active, the transistor allows current to flow through it. During the time the transistor is active, an inductor, connected to a power source in series using the transistor, is charged so that it stores energy as in step 420. After an amount of time determined by the PWM signal provided by the controller to the transistor, the controller can deactivate the transistor with the PWM signal in step 430. During the time the transistor is deactivated, the inductor becomes connected to a capacitor in series (instead of connected in parallel when the transistor is active) and charges the capacitor with energy it initially stored when the transistor was active as in step 440. A diode can be used to prevent the inductor from charging itself. In the next step, 450, the voltage in the capacitor, when the capacitor is sufficiently charged, becomes connected in series with the power source's voltage because the diode becomes an open circuit. With the diode being an open circuit, the diode prevents reverse charging of the inductor. In step 460, the capacitor discharges to an LED in series with the power source discharging to the LED. Together, the capacitor and the power source provide a boosted voltage to the LED comprising the voltage of the power source added to the voltage of the capacitor. The capacitor provides charge until it is substantially discharged as in step 470. At which point, the process can repeat with step 410.

Various embodiments have been described. Such examples are non-limiting, and do not define or limit the scope of the invention in any way.

The invention claimed is:

1. An LED driver comprising:

a main power source;

a transistor electrically connected to a controller, the controller configured to switch the transistor between an active state and an inactive state; and an inductor electrically connected to the transistor and a diode at a first end and further electrically connected to the main power source and a capacitor at a second end, the diode electrically connected to the capacitor at one end and electrically connected to the transistor and the inductor at a second end; wherein when the transistor is in the active state, the inductor is charged by the main power source and the inductor is connected in parallel with the capacitor; and when the transistor is in the inactive state, the inductor is connected in series with the capacitor and the inductor charges the capacitor through the diode until a capacitor current is greater than a diode current, at which point the capacitor's voltage is in series with the main power source's voltage, and the sum of their voltages supply power to an LED electrically connected to the capacitor.

2. The LED driver of claim 1, wherein the transistor, the inductor, and the capacitor are discrete components.

3. The LED driver of claim 1 further comprising a resistor electrically connected to the transistor in series, the resistor configured to limit current drawn from the main power source when the transistor is in the active state.

4. The LED driver of claim 1, further comprising a second resistor electrically connected to the capacitor in series through the LED and configured to limit current flowing through the LED when the transistor is in the inactive state and the capacitor and the main power source supply power to the LED.

5. The LED driver of claim 1, wherein the controller is configured to send a pulse width modulation (PWM) signal to the transistor to switch the transistor between the active state and the inactive state.

6. The LED driver of claim 5, wherein the controller is configured to adjust a duty cycle of the PWM signal to adjust an output voltage provided to the LED.

7. The LED driver of claim 6, wherein increasing the duty cycle of the PWM signal increases the output voltage provided to the LED.

8. The LED driver of claim 1, wherein the transistor is a bipolar junction transistor comprising a base, a collector, and an emitter, the inductor and the diode electrically connected to the collector, the controller electrically connected to the base.

9. The LED driver of claim 1, wherein the inductor is a high frequency inductor.

10. The LED driver of claim 1, wherein the capacitor and the main power source supply power to multiple LEDs.

11. A discrete LED driver comprising:

a power source;

a controller electrically connected to a transistor at a first node, the controller configured to switch the transistor between a first state and a second state;

one or more inductors electrically connected to the transistor at a second node;

a diode electrically connected to the transistor and the one or more inductors at the second node;

one or more capacitors electrically connected to the transistor at the second node via the diode; wherein when the transistor is in the first state, the power source charges the one or more inductors and the one or more inductors are connected in parallel with the one or more capacitors; and when the transistor is in the second state, the one or more inductors are connected in series with the one or more capacitors and the one or more inductors charge the one or more capacitors through the diode until a current of the one or more capacitors is greater than a diode current, at which point the voltage of the one or more capacitors is in series with the power source's voltage, and the sum of their voltages supply power to an LED.

12. The discrete LED driver of claim 11 wherein the first state is an active state and the second state is an inactive state, the active state completing a circuit between the power source and a ground through the one or more inductors, the inactive state disconnecting the circuit between the power source and the ground.

13. The discrete LED driver of claim 12, further comprising one or more resistors electrically connected to the transistor at a third node, the one or more resistors configured to limit the current from the power source when the transistor is in the active state.

14. The discrete LED driver of claim 13, wherein the transistor is a bipolar junction transistor comprising a base, a collector, and an emitter; and wherein the first node is the base, the second node is the collector, and the third node is the emitter.

15. The discrete LED driver of claim 11, wherein the controller uses a pulse width modulation signal to switch the transistor between the first state and the second state.

16. The discrete LED driver of claim 11, wherein the diode is a Schottky diode.

17. A method of providing power to one or more LEDs comprising:

providing a transistor with a PWM signal to activate the transistor, wherein when activated, an inductor, connected in series with the transistor and a power source and connected in parallel with a capacitor, is charged by the power source;

providing the transistor with the PWM signal to deactivate the transistor, wherein when deactivated:

the inductor becomes connected in series with a capacitor and charges the capacitor through a diode, wherein the diode is electrically connected to the capacitor at one end and electrically connected to the transistor and the inductor at a second end; and a voltage across the capacitor becomes connected in series with the power source and discharges to the one or more LEDs, the voltage across the capacitor being added to the voltage provided by the power source.

18. The method of claim 17, further comprising limiting current provided to the inductor from the power source using a first limiting resistor when the transistor is activated.

19. The method of claim 17, further comprising limiting current provided to the one or more LEDs from the capacitor and the power source using a second limiting resistor when the transistor is deactivated.

20. The method of claim 17, further comprising adjusting a duty cycle of the transistor using the PWM signal to adjust an output voltage provided to the one or more LEDs.

* * * * *